(12) United States Patent
Davis (10) Patent No.: US 12,225,967 B2
(45) Date of Patent: Feb. 18, 2025

(54) MIDSOLE FOR A SHOE

(71) Applicant: ECCO SKO A/S, Bredebro (DK)

(72) Inventor: Peter John Davis, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 0 days.

(21) Appl. No.: 16/763,480

(22) PCT Filed: Nov. 13, 2018

(86) PCT No.: PCT/EP2018/081001
§ 371 (c)(1),
(2) Date: May 12, 2020

(87) PCT Pub. No.: WO2019/092262
PCT Pub. Date: May 16, 2019

(65) Prior Publication Data
US 2020/0329811 A1    Oct. 22, 2020

(30) Foreign Application Priority Data

Nov. 13, 2017  (EP) ................ 17201296

(51) Int. Cl.
*A43B 13/18*   (2006.01)
*B33Y 10/00*   (2015.01)

(52) U.S. Cl.
CPC .......... *A43B 13/181* (2013.01); *A43B 13/186* (2013.01); *B33Y 10/00* (2014.12)

(58) Field of Classification Search
CPC ..... A43B 13/18; A43B 13/181; A43B 13/186; A43B 13/127; A43B 1/0009; A43D 2200/60

(Continued)

(56) References Cited

U.S. PATENT DOCUMENTS 2,432,533 A * 12/1947 Margolin ................ A43B 7/06
                                                    36/3 B
5,381,607 A *  1/1995 Sussmann ............ A43B 1/0009
                                                    36/28

(Continued)

FOREIGN PATENT DOCUMENTS

CN          105473017 A     4/2016
DE    10 2016 124724 A1     6/2017

(Continued)

OTHER PUBLICATIONS

Demand Under Article 31 of the PCT dated Sep. 3, 2019, Re: PCT/EP/2018/081001.

(Continued)

*Primary Examiner* — Khoa D Huynh
*Assistant Examiner* — Haley A Smith
(74) *Attorney, Agent, or Firm* — Lee & Hayes, P.C.

(57) ABSTRACT

A midsole for a shoe, where the midsole is 3D printed from an elastic polymeric material, the midsole comprising: a sole facing surface, a foot facing surface, a plurality of walls that in a first position are substantially perpendicular to the sole facing surface that extend from the sole facing surface to the foot facing surface where each wall has a height, where the plurality walls define a plurality of cells having a central axis that is substantially parallel to the walls and having a radius from a wall to the central axis, where the walls in a second position are configured to elastically deform upon application of an external force so that the deformation provides a change in the radius and/or the height, and where the walls are adapted to return to their first position upon removal of the external force.

20 Claims, 4 Drawing Sheets

(58) Field of Classification Search
USPC .......................................................... 36/25 R
See application file for complete search history.

(56) References Cited

U.S. PATENT DOCUMENTS

| | | | | |
|---|---|---|---|---|
| 5,771,611 | A * | 6/1998 | Chang | A43B 13/20 |
| | | | | 36/137 |
| 6,820,353 | B2 * | 11/2004 | Oman | A43B 13/186 |
| | | | | 36/28 |
| 9,204,680 | B2 * | 12/2015 | Hoffer | A43B 13/187 |
| 10,143,266 | B2 * | 12/2018 | Spanks | A43B 13/181 |
| 10,631,592 | B2 * | 4/2020 | Lee-Sang | A43B 9/14 |
| 2007/0180730 | A1 * | 8/2007 | Greene | A43C 1/006 |
| | | | | 36/3 R |
| 2012/0180335 | A1 | 7/2012 | Mahoney | |
| 2012/0266492 | A1 * | 10/2012 | Youngs | A43B 13/127 |
| | | | | 36/83 |
| 2013/0125416 | A1 * | 5/2013 | Hoffer | A43B 13/22 |
| | | | | 36/83 |
| 2015/0040428 | A1 * | 2/2015 | Davis | A43B 13/12 |
| | | | | 12/146 B |
| 2015/0128448 | A1 * | 5/2015 | Lockyer | A43B 13/186 |
| | | | | 36/28 |
| 2015/0245683 | A1 | 9/2015 | Cross et al. | |
| 2017/0119092 | A1 * | 5/2017 | Lee-Sang | A43B 13/40 |
| 2020/0329811 | A1 * | 10/2020 | Davis | A43B 13/181 |

FOREIGN PATENT DOCUMENTS

| | | | |
|---|---|---|---|
| WO | WO 2012/099639 A1 | 7/2012 | |
| WO | WO 2014/071977 A1 | 5/2014 | |
| WO | WO-2014207423 A1 * | 12/2014 | ........... A43B 1/0009 |
| WO | WO 2016/092353 A1 | 6/2016 | |

OTHER PUBLICATIONS

International Search Report and the Written Opinion Dated Dec. 10, 2018 From the International Searching Authority Re.: Application No. PCT/EP/2018/081001.
PCT Notification Concerning Transmittal of International Preliminary Report on Patentability, Re: PCT/EP/2018/081001, Mailed Feb. 10, 2019.
Extended European Search Report dated Mar. 4, 2018 from the European Patent Office Re: EP Application No. 17201296.5.
Examination Report from the European Patent Office in counterpart European Application No. 18799545.1, mailed Mar. 4, 2021 (6 pages).
First Office Action and Search Report from the China National Intellectual Property Administration in counterpart Chinese Application No. 201880073383.1, with English-language translation, mailed May 28, 2021 (11 pages).

* cited by examiner

MIDSOLE FOR A SHOE

CROSS REFERENCE TO RELATED APPLICATIONS

This application is a national stage filing under 35 U.S.C. § 371 of International Application No. PCT/EP2018/081001, filed on Nov. 13, 2018, and published as WO 2019/092262 A1, which is based upon and claims priority to European Patent Application Ser. No. 17/201,296.5, filed on Nov. 13, 2017, the disclosures of which applications are incorporated herein by reference in their entireties.

FIELD OF INVENTION

A midsole for a shoe, where the midsole is 3D printed from an elastic polymeric material.

BACKGROUND

Shoe manufacturing has gone through a number of different iterations of technology, where manufacturing methods for shoes changes with advancing technology. The purpose of evolving shoe technology can be relatively broad, where some manufactures focus primarily on the appearance of shoes, breathability, performance for a specific activity, while still others focus on the comfort of shoes.

The focus of one purpose does not necessarily exclude any of the other purposes, but it has long been known in the industry that you might have to sacrifice parts of comfort for looks, or vice versa. It is fair to consider that most manufacturers would want to obtain a shoe having the perfect look, where the comfort of the shoe is also optimal.

However, the problem with the concept of optimal comfort of a shoe is highly dependent on the user, as shoes are for the most parts mass produced, in order to reduce the production cost of the shoes, as shoes that are individually tailored for a user are often quite expensive, compared to a mass produced shoe. The reason for the increase in cost is that individually tailored shoes are often dependent on measurements and adjustments made by manufacturing staff, which means that the labor cost of an individualized shoe may be quite extensive.

However, there have been solutions to try and solve this, where a mass produced shoe is produced having an upper, and outsole and a midsole, where the adjustment for the shape of a foot is provided in the form of an insole that may either have some specific features or to individualize the insole for the user, by e.g. providing an insole having a raised arch, or increased cushioning in the heel or ball area.

However, a problem with this approach is that the insoles are not individually fitted to the rest of the shoe, i.e. the outsole or the midsole, where both of these parts may have a predefined functioning which the insole may interfere with, or reduce the effect of.

DE102016124724 discloses an individualized orthopedic shoe insert where a support structure may be included in the insert. The support structure may have openings or perforations provided in the form of hexagons, where the height and the width of the openings can be varied as needed to adapt the wearing properties of the insole. It is disclosed that the support structure has a low compressive elasticity and high rigidity, where the support structure may be provided with separate dampening or cushioning elements, that change certain areas of the support structure.

Thus there is a need to improve the method of providing individualized shoes for users, where a main part of the shoe, is individually manufactured for a specific user and the shape of the foot of this particular user.

GENERAL DESCRIPTION

In accordance with the invention, there is provided a midsole for a shoe, where the midsole is 3D printed from an elastic polymeric material, the midsole comprising: a sole facing surface, a foot facing surface, a plurality of walls that in a first position are substantially perpendicular to the sole facing surface that extend from the sole facing surface to the foot facing surface where each wall has a height, where the plurality walls define a plurality of cells having a central axis that is substantially parallel to the walls and having a radius from a wall to the central axis, where the walls in a second position are configured to elastically deform upon application of an external force so that the deformation provides a change in the radius and/or the height, and where the walls are adapted to return to their first position upon removal of the external force.

Within the meaning of the present invention the term "midsole" means a layer of a footwear, where the layer may be positioned below an insole of a shoe, where the insole is positioned between the foot of the user and the midsole. A midsole may form the outsole of the shoe, and/or may be positioned between the insole and an outsole of a shoe. The midsole may be provided as shock absorption in the shoe.

Within the meaning of the present invention the term radius may mean the distance from a central axis of a cell to a wall of the midsole, where the central axis may be a vertical axis that extends through the centre of the cell seen in a vertical direction.

By providing a 3D printed midsole in accordance with the invention, it is possible to measure the foot of a specific user, and based on these measurements to create a midsole where the form, softness/hardness is customized for the specific user.

The form of the midsole may be adjusted by providing the walls in a different number of layers, where the part of the midsole that is intended to have a reduced height may be provided with walls having a low number of layers, where the parts of the midsole that is intended to have an increased height may be provided with an increased amount of layers positioned on top of each other. The areas that are intended to have a lower height may e.g. be the forefoot area, where the higher areas may e.g. be the arch area on the medial part of the midsole, and e.g. the heel area. Thus, as the midsole may be utilized to be formed completely after the form of the foot of the specific user, the shoe which the midsole is to be used in may be formed in a relatively generic form, where the upper and the outsole may be joined together, where inner surface of the outsole may be relatively flat and not shaped to the form of the foot in the sense of the height. Thus, the inner surface of the outsole, i.e. the foot facing surface of the outsole, or the foot facing surface of the shoe, if it is provide with an intermediate part, may be relatively flat, and may be provided as a receiving surface for the lower part of the 3D printed midsole. Thus the foot facing surface of the outsole may be provided in the shape of the foot, in the longitudinal and transversal directions but not having any characteristic foot shape in the height direction, i.e. in the direction perpendicular to the longitudinal and/or the transversal direction of the foot. Thus, a shoe having the correct size for the user, may be provided with a 3D printed midsole that is on the foot facing surface is specifically formed, especially in the height direction, to the contours of the foot of the user, and may be enforced or softened in areas that are specifically chosen for each specific user, in the form of a gait, pressure and contour analysis of the foot either during walking, running or stationary positioning.

Thus, the present invention may also relate to a shoe having a 3D printed midsole in accordance with the above disclosure.

The advantages of the 3D printed midsole in accordance with the invention may be seen as a relationship between the plurality of walls, and the plurality of cells defined by the walls. There are a number of ways how to control the resistance of the walls, such as the thickness of the walls in relation to the height of the wall, as well as the radius of the cells, or a combination of both elements. By providing walls having a certain thickness, the thickness of the walls may on their own define the amount of pressure required to deform these walls, so that the walls may buckle under the pressure applied. A thicker wall will require more pressure to deform than a thinner wall having the same height, if the walls are made of the same material having the same physical properties. Furthermore, the number of walls in a certain predefined area, such as a square centimetre, or square inch, will also influence the resistance of the midsole, as an increased amount of walls will distribute the load applied to the predefined area on an increased amount of walls. Furthermore, the size and/or the radius of the cells may also influence the resistance which the midsole applies to e.g. the foot. Thus, a cell having a smaller radius, i.e. having walls enclosing the cell, will have an increased surface area of walls (top ends of the walls) that intersect the force applied to the midsole. Yet further, the height of the walls may also influence the resistance of the midsole, as wall that has a height that is greater than a lower wall will be more likely to deform, if the walls are identical.

Another way of controlling the resistance of the midsole is how one wall is connected to a second wall, as well as the form of the wall. If one wall is connected to another wall at an angle, i.e. that the planes of the walls intersect at an angle, the second wall may provide an increased resistance to the first wall and vice versa, as the walls are angled towards each other and provide structural resistance to each other, especially if one wall is connected to a second wall along its entire height.

When pressure is applied to the walls, e.g. when a foot is positioned on top of the foot facing surface of the midsole, the force of the foot, i.e. the weight of the user is applied to a top end of the wall, and when the force applied to the wall exceeds a certain limit, the wall will deform, and as the bottom end (second end) of the wall is restricted inside the shoe by the foot facing surface of the outsole, the first end will move in a direction towards the second end, and for this to happen, the wall will deform, by buckling, expanding or other ways, in order to allow the first end to move in a downwards direction. As the wall will deform, it is important that the deform of the wall is unrestricted in at least one direction, i.e. in the direction towards the central axis of the cell. Thus, the deformed wall is allowed to deform freely into the cell, so that the radius between the wall and the cell is reduced in at least one area. The form of the cell, e.g. the shape of the cell seen from above or the side, may also influence the deformation of the wall, as a connected wall and the angle of the connection may increase or decrease the resistance of the wall.

A single cell may be provided by a circular wall, that in multiple layers provides a cylindrical wall, where the outer surface of the wall may be connected to a second wall. Thus, the cell structure may be a plurality of cylindrical cells, connected to other cylindrical cells via the walls.

The midsole may be utilized for providing a shock absorption in a shoe, where the foot facing surface of the midsole is receives the weight of the user, while the sole facing surface provides a counterforce to the weight of the user. The elastic deformation of the midsole may be in the form of a compression of the walls in a vertical direction, in a direction parallel to a central axis of the wall. The deformation may occur by the wall bending, buckling, compressing.

In one embodiment the shoe facing surface of the midsole may be substantially planar. The planar shoe facing surface ensures that the upper surface (foot facing surface) of the midsole provides the contouring of the foot, and not the prefabricated shoe that is adapted to receive the midsole.

In one embodiment the peripheral boundary of a cell may comprise at least two walls. By providing a cell that has at least two walls it is possible to provide cells where a plurality of walls, or at least two walls are connected to each other, so that the walls can provide structural support to each other. In one embodiment the cells may be triangular, rectangular, pentagonal, semi-circular, or of any suitable form, where the at least two walls are connected to each other, and the connected walls enclose an area/volume creating at least one cell.

In one embodiment the midsole is elastically deformable, where the walls of the 3D printed material are capable of storing mechanical energy and subsequently release the energy to absorb shock, and/or to maintain a force between the foot facing surface and the sole facing surface. Thus, each wall of the midsole may be provided with a shape, where the shape is capable of deforming and storing mechanical energy, which is applied to the wall, where each wall is connected to a second wall forming a counterforce to the stored energy, and where some of the energy loaded up in one wall may also be transferred to a second wall, via a mechanical coupling between the two walls. When the force is released from the wall, the wall will release its stored-up energy and return to its original position from a deformed position. Thus, each wall operates as a resilient member that is capable of storing energy on its own. Furthermore, when formed in a plurality of walls forming one or more cells, the mechanical energy the walls can store may be increased by the number of walls. Thus, a plurality of walls stores more energy than one wall on its own.

In one embodiment the midsole may comprise at least two layers of material that are bonded to each other. The 3D printing of the midsole may be done by adding one layer on top of another layer, and continuing this until the wall has a desired height. The 3D printing may advantageously be done using a liquid form polymer, that cures when it has been positioned in its correct position. An example of this is a liquid silicone polymer, that is added in in the same direction as the layer which it is positioned on top of, so that a wall may be a number of discrete lines of polymer added on top of each other, where the lines are parallel to each other when 3D printed on top of each other. The material is advantageously elastic, so that the deformation of the material, during application of pressure is reversible, and the material does not plastically deform when deformed, I.e. having a high ratio of stress/strain relationship before a plastic deformation occurs.

In one embodiment each wall may comprise at least two layers of material. In accordance with the invention it may be advantageous that each wall has at least two layers of material, where the upper limit of the number of layers is indefinite. By providing at least two layers of material, it is ensured that the height of the wall is larger than the width of the wall, ensuring that the wall can deform in the width direction by either compression or controlled collapse.

In one embodiment the radius of each cell may be between 1.5 mm and 8 mm, or more particularly between 2 mm and 7.5 mm, or more particularly between 2.5 mm and 7 mm, or more particularly between 2.7 mm and 6.5 mm. The size of the cell may be adjusted based on the requirements of the resistance in a particular area of the midsole. Thus by providing a smaller radius it is possible to provide a high number of cells on the midsole, while a larger radius would reduce the number of cells that may be applied on the midsole, as the radius of the cells provides a predefined area which a single cell takes up on the shoe facing surface and/or the foot facing surface. The midsole may be provided with a number of different sizes of cells, where one area of the midsole may have cells having a certain cell size, while another area may have a different cells size. The size of the cells may easily be utilised to provide the midsole with areas having different resistance to the force applied, as the reduced size of cells provides a larger amount of walls in a certain predefined area (square centimetre/inch). Thus the size of the cells may be utilized to provide different resistances in certain areas of the midsole.

In one embodiment the plurality of cells may have a first radius in the heel area and a second radius in a forefoot area, where the first radius is larger than the second radius, or alternatively where the first radius is smaller than the second radius. This difference in radius may control the resistance and/or the elasticity of the midsole in the predefined areas.

In one embodiment the plurality of walls may have a first height in the heel area, and a second height in the forefoot area, where the first height may be larger than the second height, or alternatively that the first height may be smaller than the second height. The height of the walls may be utilized to provide the midsole with the customized curvature that is required for a certain user, i.e. to provide a certain drop between the heel area and the forefoot area, depending on what the user wants to utilize the midsole for. I.e. for certain types of training it is advantageous to have a larger drop, e.g. for running, than it what is required for e.g. walking or other types of training. Thus the 3D printing of the midsole may be utilized to customize what the user wants to use the shoe for. Alternatively, the user may have a number of different types of midsoles, where the midsole may be exchanged for a certain type of activity.

In one embodiment the plurality of walls may have a third height in the arch area, and a second height in the forefoot area and a first height in the heel area, where the first and/or the second height may be larger than the third height, or alternatively that the first height or the second height may be smaller than the third height. Thus the height of the wall may be utilized to provide the user with the required support in a certain area. E.g. if the user has a flatfoot, i.e. a low arch area, the midsole may be provided with an increased height in this area to provide the necessary support for the user, in order to reduce wear and tiredness of the user during walking or other activities.

In one embodiment the midsole is divided into a forefoot area and/or a heel area, where the forefoot area and the heel area are delimited by a line extending from the medial side of the midsole to the lateral side of the midsole. The line may be an imaginary line, or a line that is delimited by a differential size of walls and/or cells. The division into the discrete areas is often generic in relation to a foot, and would assist the designer to limit the amendments to a certain area, i.e. with an increase in height in the arch area, the line would limit the height difference towards the heel area, ensuring that the increased height does not move into the heel area as well, and thereby reducing the chance of creating an area of decreased comfort.

In one embodiment the elastic polymer material may be a silicone based material, a silicone composition or a silicone mixture composition. A silicone composition may include any silicone material that is useable for 3D printing, wherein a silicone material may be arranged in layers, where each wall comprises a plurality of layers of that are stacked on top of each other.

In one embodiment the hardness of the polymer may be between 30 and 90 Shore A when cured, preferably between 35 and 85 Shore A, more preferably between 65 and 85 Shore A, more preferably between 70 and 80 Shore A, more preferably around 75 Shore A. One example of a polymer is silicone, where one type may be Dow Corning LC3335 Liquid Silicone Rubber designed for 3D printing, having approximately 50 Shore A hardness. Other types of polymers and silicones that are adapted for 3D printing may also be utilized, and the specific type of silicone or polymer is not essential for the invention, but the elasticity, the hardness and the capability of 3D printing may be seen as the important factor. The resulting shore A hardness of the midsole may be lower than the shore A hardness of the material, due to the flexibility of the walls defining a plurality of cells. Thus, the flexibility of the walls into the cells provides a lower material hardness over an area or volume where the material comprises both cells and walls.

The 3D printing method use is the Fusion Deposition Modelling, that forces two defined fluids through a static mixer, which subsequently extrudes out of a nozzle, which depends on the precise application. One printing apparatus that may be used is the German RapRap GMbH 3D printer X400 PRO 3D printer. Other types of printers could be used.

In one embodiment the thickness of the each wall may be between 0.4 and 1.6 mm, more preferably between 0.5 and 1.2 mm, more preferably between 0.6 and 1.0 mm, or more preferably between 0.7 and 0.9 mm. The thickness of the walls may be controlled by either the thickness of the 3D printed lines, and or a multiplicity of the 3D printed lines. The thickness of the lines may control the resistance of the walls, as an increased thickness will provide an increased resistance. Some areas of the midsole may have walls having one thickness where others may have an increased or a decreased thickness, depending on the desired functionality of the areas.

In one embodiment the structural stability may be stronger in a direction of the thickness of the midsole (e.g., the direction of axis A in FIG. 4), than in the longitudinal direction and/or transversal direction of the midsole. Thus the resistance of the midsole may be higher in the vertical direction than in a longitudinal or transversal direction of the midsole. This higher resistance assists the contouring of the midsole, as the user provides a force vector when using the midsole, that is primarily in the vertical direction. Thus, by providing an increased resistance in the vertical direction, i.e. somewhat parallel to the walls, it may be possible to deform the midsole easily when placing the midsole into a shoe, to get it through the opening in the upper.

The midsole may be provided with an insole on top of the midsole, which may be between the foot facing surface of the midsole and the foot of the user. The provision of an insole may be to provide increased comfort, to provide an intermediate surface to distribute the force applied by the foot, so that the walls of the midsole cannot be felt by the user.

In one embodiment the midsole as a whole may be formed out of a plurality of walls and cells. Thus, the entire midsole may be constructed from the 3D printed elastic material, where the entire midsole may be 3D printed from the same material.

In one embodiment the at least one cell may be open from the sole facing surface to the foot facing surface in order to improve the breathability of the midsole and/or heat accumulation from the users' foot in the midsole. By providing cells that are open from one surface to the other, it is possible to use the deformation of the walls to provide a breathable midsole. When the midsole is deformed using force from the foot, the cells may create a vacuum effect or increased pressure, in order to aerate the sole of the foot when using. Alternatively, the cells may be used to transfer air from inside the shoe to the outside via fluid communication means and/or channels that may be provided in the outsole of the shoe.

In one embodiment at least one cell may be void of any liquid, particulate or solid material, allowing the walls in a second position to deform into the volume defined by the cell in its first position without any substantial resistance. Thus, the midsole is provided in such a manner that there is no material other than air, or similar gaseous substances inside the cells, so that there are no parts of the cells that prevent the walls in deforming and/or collapsing, and the content of the inner volume of the cell has no effect on the resistance of the midsole and/or the walls.

The present description may further relate to a sole assembly for a shoe, where the sole assembly comprises an outsole, providing a ground contacting surface, the midsole in accordance with the description and where the sole assembly may further comprise an insole, which during use may be provided between the midsole and the foot of the user.

In one embodiment the periphery of the midsole, i.e. to the sides, toe and heel area, is provided with a wall, defining the outer periphery of the midsole. Thus, the midsole may be provided with a sidewall where the sidewall defines the outer periphery of the midsole. The layers the layers of the sidewall may be parallel to the periphery of the midsole. Thus, the peripheral side wall of the midsole may close off a cell which abuts the side wall, which means that the side wall will prevent access into any cell in a sideward direction.

In one embodiment each layer of material of the midsole may be 3D printed on top of a prior layer.

DETAILED DESCRIPTION

Figure 1:
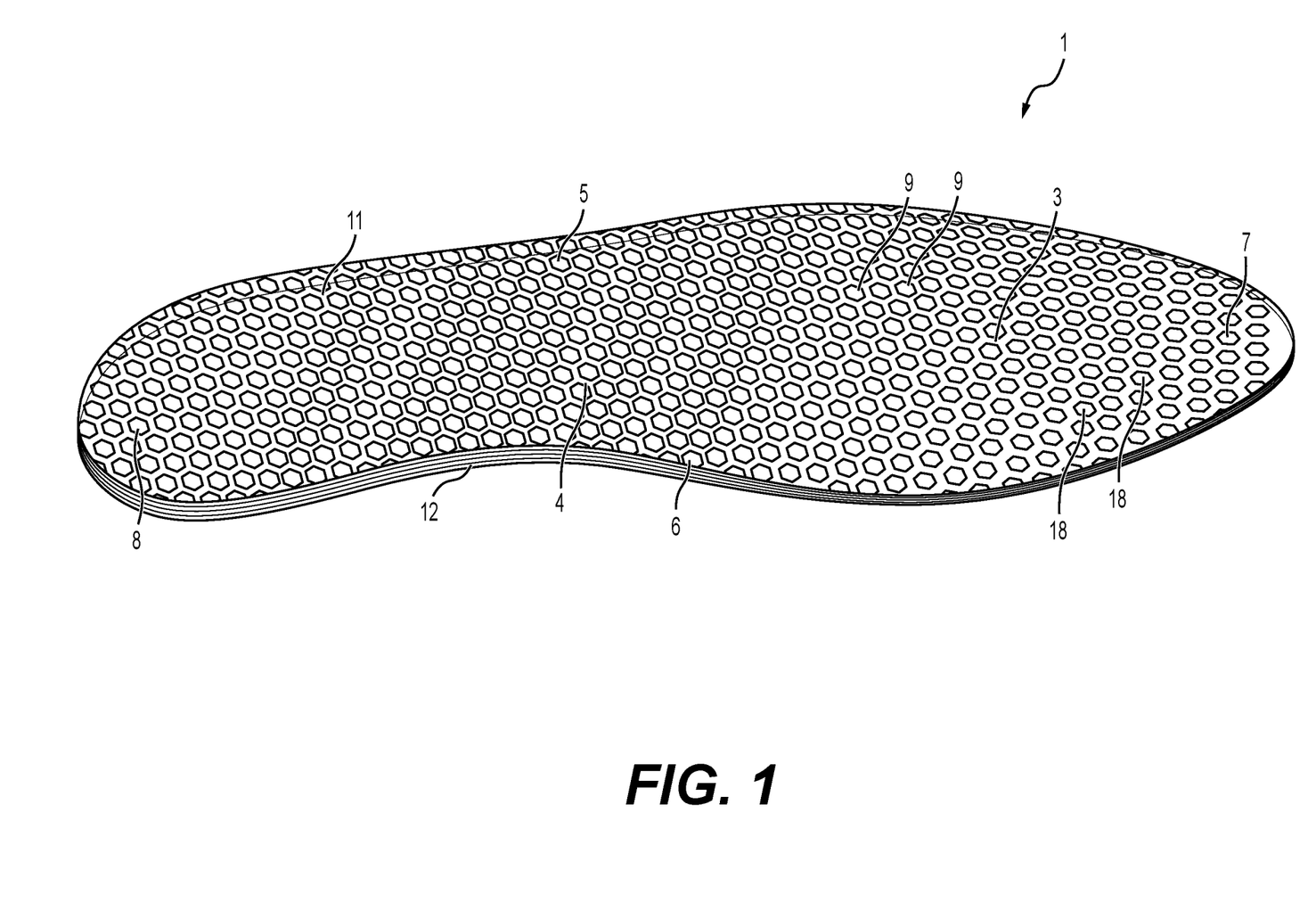
FIG. 1 shows a perspective view of a midsole in accordance with the invention.

FIG. 1 shows a perspective view of a midsole 1, having a heel area 2, an arch area 3, and a forefoot area 4. The midsole comprises a lateral side 5 and medial side 6, as well as a toe end 7 and a heel end 8. The heel area 2 is configured to receive the heel of the foot, where the heel area is the area of the midsole which receives the first impact, during movement. As may be seen in this figure, the heel area has a greater height than the forefoot area 4, where the arch area 3 on the medial side 6, has a height that may be greater than the heel area and the forefoot area.

The midsole 1 comprises a plurality of cells 18, and a plurality of walls 9, where the walls are interconnected to each other, creating a number of open cells 18 in the midsole 1. In this exemplary embodiment, the walls create a cell 18 having a hexagonal shape, where each cell 18 has six walls, that are interconnected and each wall in the central area 10 of the midsole defines one wall of two cells.

The peripheral area 11 of the midsole 1, may be provided with a peripheral wall 12, which extends around the periphery of the midsole, in order to provide a peripheral wall that can contact a respective surface of an outsole and/or an upper, when the midsole 1 is inserted into a shoe.

Figure 2:
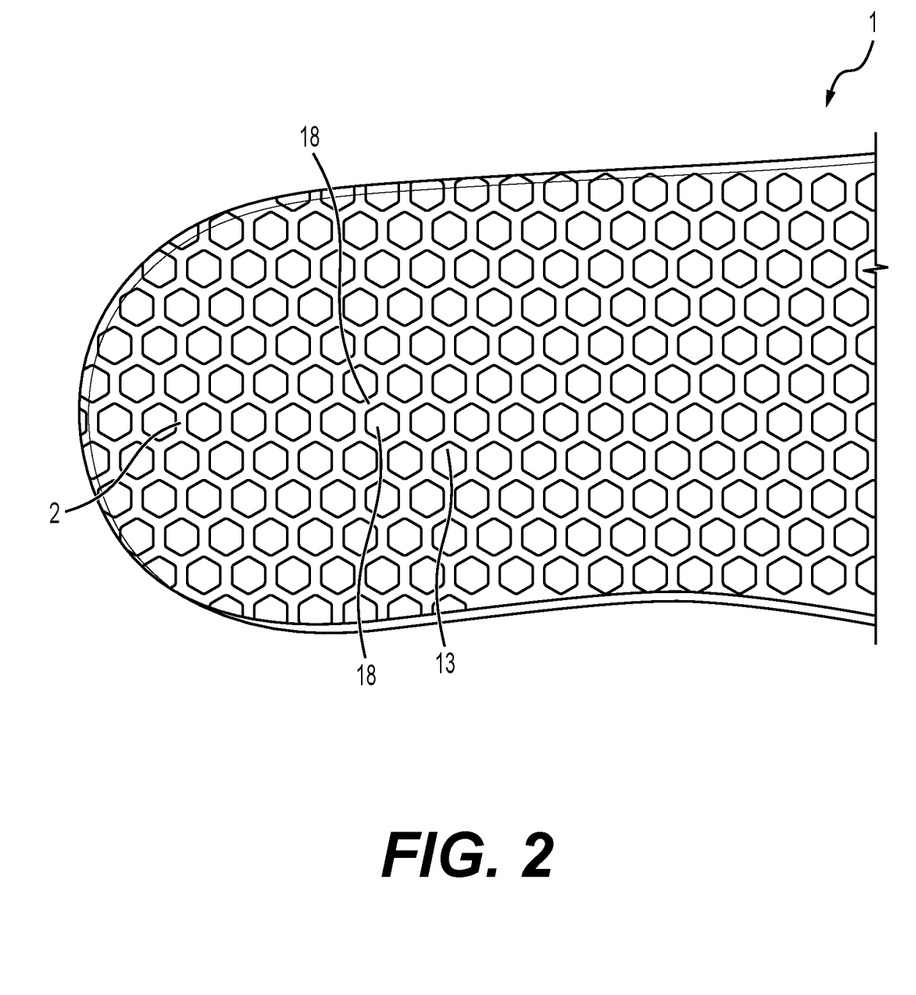
FIG. 2 shows a top view of a heel area of a midsole in accordance with the invention.

FIG. 2 shows a top view of a midsole 1 in accordance with the invention, where the midsole is provided with at least one reinforcement part 13, where the reinforcement part may be adapted to extend from one wall 9 of a cell 18 to an opposing wall of the same cell 18, in order to provide additional structural stability to the walls 9 surrounding the cell 18. The reinforcement part 13, may be utilized to provide a directional stability to the midsole 1, so that the reinforcement part 13 may reinforce certain areas of the midsole, in order to differentiate certain parts of the midsole. A similar reinforcement may be done by provided the reinforcement part as an increased thickness of material in predefined walls, where the thickness may be higher than the thickness of other walls of the midsole 1.

Figure 3:
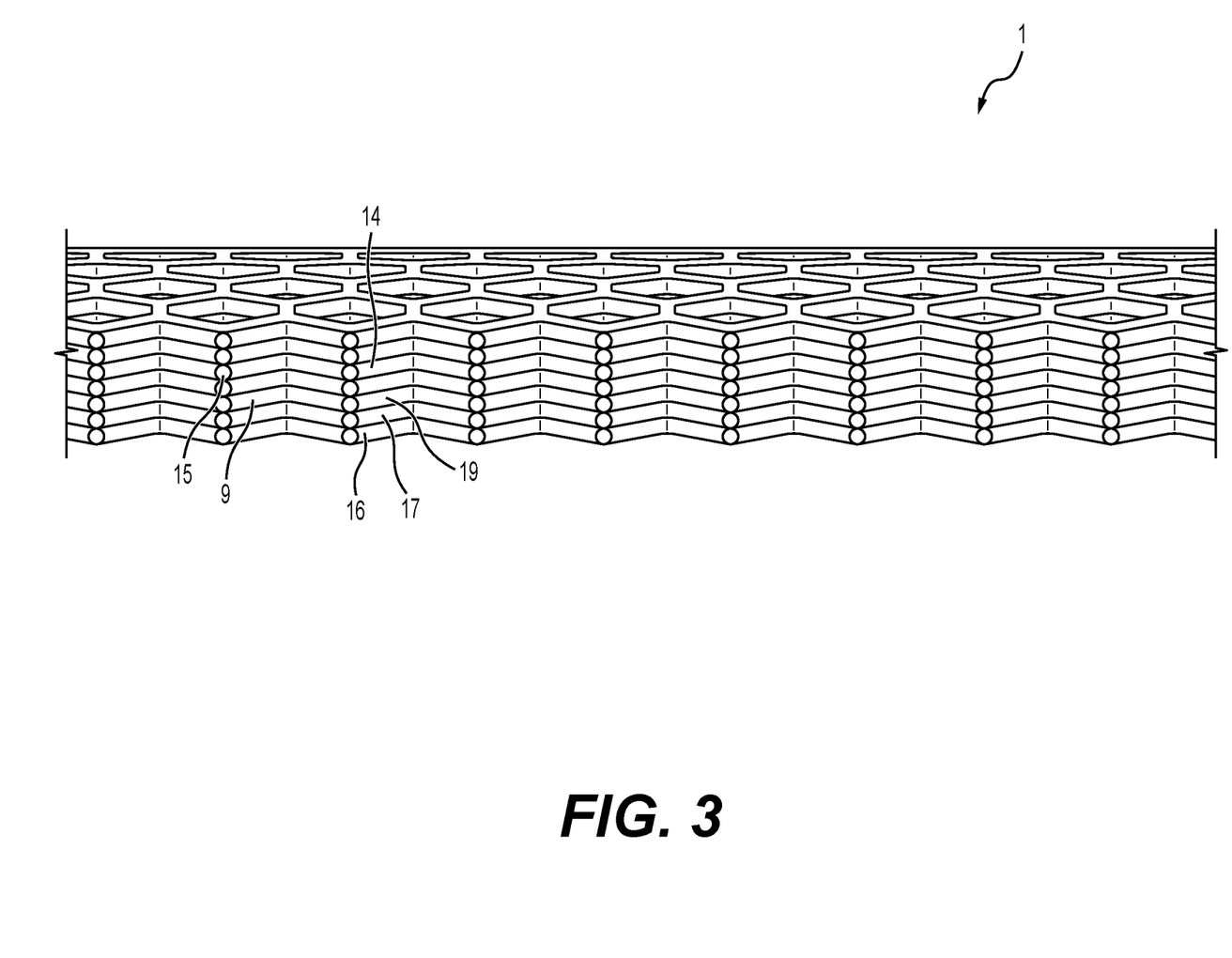
FIG. 3 shows a sectional view of the present invention.

FIG. 3 shows a sectional view of a midsole 1 in accordance with the invention, where the sectional view is taken along axis III-Ill seen in FIG. 2. FIG. 3 shows the construction of each wall, taken from the side, where it may be seen that each wall 9, is constructed of a plurality of layers 14 which are stacked on top of each other when the layers are 3D printed during the manufacturing of the midsole. The layers, a sectional view of the layers may be seen, where each layer comprises a strand 15 of material, that is substantially circular in its cross sectional shape. Each strand 15 of material creates a layer and each layer may be distributed throughout the entire area of the shoe, especially when speaking of the bottom most layer 16, which creates a substantially planar bottom surface of the midsole, where the subsequent layers 17, 19, may be distributed along only parts of the midsole, especially when one part of the midsole comprises fewer layers in a certain area than it does in another area. E.g. when the heel area comprises 6-10 layers of material, the arch area may comprise 10-14 layers of material, to raise the arch part, and/or the forefoot area may comprise even fewer areas, or e.g. 4-6 layers. This magnitude of layers is only exemplary, and is not representative of all embodiments of the midsole 1.

Figure 4:
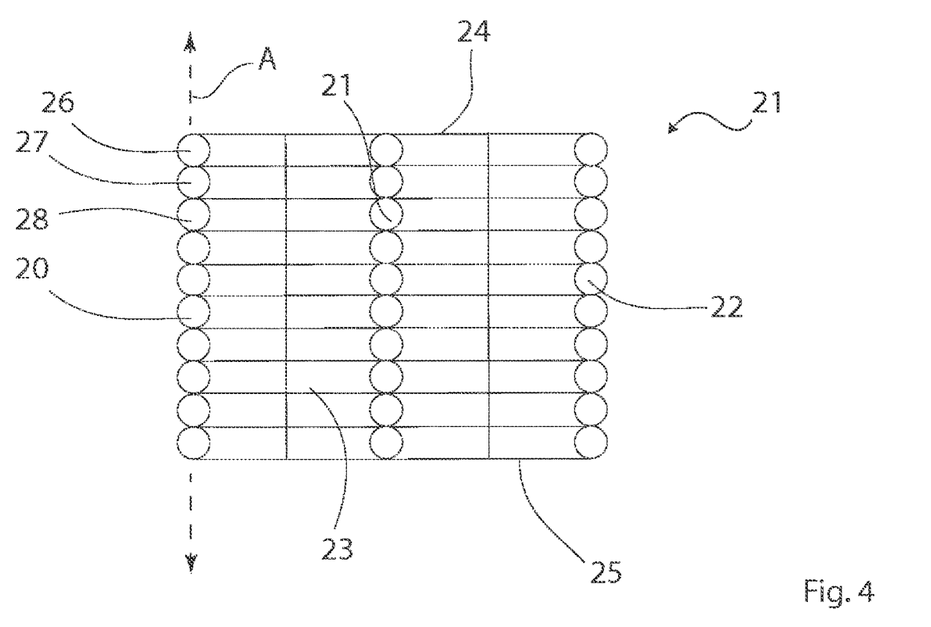
FIG. 4 shows a sectional view of three walls of a cell of a midsole in accordance with the invention.

FIG. 4 shows a sectional schematic view of three walls 20, 21, 22 of a cell 23. The cell has a foot facing surface 24 and a sole facing surface 25, where the foot facing surface faces the foot of the user, and the sole facing surface faces the sole of the shoe, when the midsole 1 is positioned in the shoe. Each wall 20, 21, 22 extends substantially along a longitudinal axis A, where the longitudinal axis is substantially vertical (when the midsole is arranged in a shoe) or a normal to the sole facing surface of the midsole 1.

A first layer 26 of a 3D printed material is positioned on top of a second layer 27 of 3D printed material, which in turn is positioned on top of a third layer 28 of 3D printed material, where each layer fuses and/or bonds to the previous layer, so that one wall 20, 21, 22, is capable of deforming away from the longitudinal axis A, when a force is applied in the direction of the longitudinal axis A. Thus, each wall provides a resistance to the force, but when the force applied to a single wall exceeds the bending force of the wall, at least a part wall will deflect away from the longitudinal axis. When the force is removed from the wall, the wall will return to its original position due to the shape memory of the elastic material of the 3D printed wall.

When a force applied in the direction A is applied to the foot facing surface 24 and the sole facing surface is stationary (in the direction of axis A) and the force exceeds the bending force of one or more of the walls, the foot facing surface 24 will move closer to the sole facing surface 25, and a part of the wall will begin to move away from the longitudinal axis, to give room for the movement of the surfaces 24, 25 to move closer to each other. The open space in the cell 23 or an adjacent cell (not shown) will allow the wall to deform away from the longitudinal axis, and thereby changing the form of the cell, so that the volume and/or the radius of at least part of the cell 23 decreases or increases due to the deformation of the wall. Furthermore, the force applied in the direction A may cause the wall to reduce in height, from the sole facing surface 25 to the foot facing surface 24 of the wall and/or cell.

The force applied to the midsole may be applied to the cell 23 and/or the wall in a direction that is in more than one direction, e.g. during walking or running, where the force is not only in the direction A, but may also be in a direction at an angle to the axis A. This force may cause a wall to bend away from the direction A, without buckling, causing the radius of a cell to change.

Thus, by providing a midsole having a number of walls 20, 21, 22 and cells 23 of an elastic material, it may be possible to provide a midsole that is capable of storing energy during deformation and therefore be a shock absorber in a shoe, as the midsole of the shoe.

The use of the terms "first", "second", "third" and "fourth", "primary", "secondary", "tertiary" etc. does not imply any particular order, but are included to identify individual elements.

Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A midsole insert for a shoe, where the midsole insert is 3D printed from an elastic polymeric material, the midsole insert comprising:
    a sole facing surface;
    a foot facing surface;
    a plurality of walls provided in a forefoot area, a midfoot area, and a heel area of the midsole insert, the plurality of walls configured in a first position substantially perpendicular to the sole facing surface of an entire area of each of the forefoot area, the midfoot area, and the heel area of the mid sole and extending from the sole facing surface to the foot facing surface where each wall has a height,
    wherein the plurality of walls defines a plurality of cells, each cell having:
        a central axis substantially parallel to the plurality of walls, and
        a radius defined from a respective cell wall to the central axis,
    wherein the plurality of walls includes a plurality of parallel layers of the elastic polymeric material stacked on top of one another,
    wherein the plurality of walls, in a second position, are configured to elastically deform upon application of an external force so that deformation provides a change in at least one of the radius of the cell to which the external force is applied and the height of a wall corresponding to the cell to which the external force is applied,
    wherein the plurality of walls is further configured to return to the first position upon removal of the external force,
    wherein the plurality of walls further comprises a peripheral wall, the peripheral wall extending continuously around a periphery of the midsole insert from a posterior end in the heel area to an anterior end in the forefoot area and being configured to contact a surface of an outsole or an upper;
    at least one reinforcement part extending from a wall of the plurality of walls to an opposing wall of the plurality of walls, the at least one reinforcement part configured to provide structural stability to the wall and the opposing wall; and
    wherein the midsole insert is loose.

2. The midsole insert for a shoe of claim 1, wherein a peripheral boundary of a cell comprises at least two walls.

3. The midsole insert for a shoe of claim 1, wherein the midsole insert comprises at least two layers of material that are bonded to each other.

4. The midsole insert for a shoe of claim 1, wherein each wall comprises at least two layers of material.

5. The midsole insert for a shoe of claim 1, wherein the radius of each cell is between 1.5 mm and 8 mm.

6. The midsole insert for a shoe of claim 1, wherein the plurality of cells has a first radius in the heel area and a second radius in the forefoot area, and
    wherein the first radius is larger than the second radius.

7. The midsole insert for a shoe of claim 1, wherein the plurality of walls has a first height in the heel area, and a second height in the forefoot area, the first height being larger than the second height.

8. The midsole insert for a shoe of claim 1, wherein the plurality of walls has a third height in an arch area of the midsole insert, a second height in the forefoot area, and a first height in the heel area, at least one of the first height and the second height being larger than the third height.

9. The midsole insert for a shoe of claim 1, wherein the elastic polymeric material is selected from at least one of a silicone based material, a silicone composition, and a composition comprising a mixture of silicone.

10. The midsole insert for a shoe of claim 1, wherein a hardness of the elastic polymeric material is between 30 and 90 Shore A upon curing.

11. The midsole insert for a shoe of claim 1, wherein a thickness of each wall is between 0.4 mm and 1.6 mm.

12. The midsole insert for a shoe of claim 1, wherein a structural stability of the midsole insert is stronger in a direction of a thickness of the midsole insert than in a longitudinal direction of the midsole insert and a transversal direction of the midsole insert.

13. The midsole insert for a shoe of claim 1, wherein at least one cell of the plurality of cells is open from the sole facing surface to the foot facing surface.

14. The midsole insert for a shoe of claim 1, wherein at least one cell of the plurality of cells is void of any liquid, particulate, or solid material, allowing the plurality of walls, when in the second position, to deform into a volume defined by the at least one cell, when in the first position without resistance.

15. The midsole insert for a shoe of claim 1, wherein each layer of material of the midsole insert is 3D printed on top of a prior layer.

16. The midsole insert for a shoe of claim 1, wherein the plurality of cells has a first radius in the heel area and a second radius in the forefoot area, the first radius being smaller than the second radius.

17. The midsole insert for a shoe of claim 1, wherein the plurality of walls has a first height in the heel area and a second height in the forefoot area, the first height being smaller than the second height.

18. The midsole insert for a shoe of claim 1, wherein the plurality of walls has a third height in an arch area of the midsole insert, a second height in the forefoot area, and a first height in the heel area, where at least one of the first height and the second height is smaller than the third height.

19. The midsole insert for a shoe of claim 1, wherein the midsole insert is insertable through an opening of the upper of the shoe.

20. The midsole insert for a shoe of claim 1, wherein the midsole insert is exchangeable through an opening of the upper of the shoe.

* * * * *